United States Patent [19]

Westrom et al.

[11] Patent Number: 5,286,973
[45] Date of Patent: Feb. 15, 1994

[54] RADIATION MAPPING SYSTEM

[75] Inventors: George B. Westrom, Angelus Oaks; Robert E. Carlton, Seal Beach; Lloyd R. Tripp, San Pedro, all of Calif.

[73] Assignee: Odetics, Inc., Anaheim, Calif.

[21] Appl. No.: 791,461

[22] Filed: Nov. 13, 1991

[51] Int. Cl.$^5$ .............................................. G01V 5/00
[52] U.S. Cl. ................................. 250/253; 250/515.1
[58] Field of Search .................. 250/253, 336.1, 367, 250/505.1, 515.1; 324/323, 326, 329

[56] References Cited

U.S. PATENT DOCUMENTS

| | | | |
|---|---|---|---|
| 2,562,929 | 8/1951 | Lord, Jr. et al. | 250/253 |
| 2,935,614 | 5/1960 | Teichmann et al. | 250/253 X |
| 3,008,046 | 11/1961 | Carpenter | 250/253 |
| 3,739,171 | 6/1973 | Scott | 250/336.1 X |
| 4,421,981 | 12/1983 | Hough | 250/253 |
| 4,959,547 | 9/1990 | Carroll et al. | 250/336.1 |
| 5,025,150 | 6/1991 | Oldham et al. | 250/253 |
| 5,057,690 | 10/1991 | Morgan et al. | 250/336.1 |

FOREIGN PATENT DOCUMENTS

| | | |
|---|---|---|
| 0031732 | 12/1979 | European Pat. Off. |
| 0188973 | 1/1985 | European Pat. Off. |
| 0424308A2 | 9/1989 | European Pat. Off. |
| 0425333A1 | 10/1989 | European Pat. Off. |

OTHER PUBLICATIONS

A Computer Controlled Television Detector for Light, X-Rays and Particles; Kenneth Kalata; Feb. 1, 1981; IEEE Transactions on Nuclear Science, vol. NS-28, No. 1, pp. 852-856.

Primary Examiner—Constantine Hannaher
Assistant Examiner—Edward J. Glick
Attorney, Agent, or Firm—Graham & James

[57] ABSTRACT

A high-energy radiation survey system capable of imaging and determining the distances of, sources of incident radiation and of determining the energy of such radiation, incorporating a shaped radiation detector shield and detector configured therein for low-noise collimation of the radiation for directional mapping. The system is capable of being mounted on a remotely controllable vehicle and of being operated from an operator's station remote from radiation hazards. The system can be used to generate high resolution radiation dose maps superimposed on a real-time video image of a room or other areas in nuclear power plants and other facilities using radioactive material.

9 Claims, 7 Drawing Sheets

RADIATION MAPPING SYSTEM

BACKGROUND OF THE INVENTION

1. Field of the Invention

The present invention relates generally to high-energy radiation survey equipment.

2. Description of the Prior Art and Related Information

Extensive radiation surveys for operational or maintenance purposes are frequently required in the nuclear industry and other industries using radioactive materials. Typically, these surveys are conducted by health physics personnel who place hand-held radiation detectors next to suspected radiation sources or pre-determined radiation survey points. The results of these surveys are then usually manually recorded on printed sketches of the areas surveyed.

This technique suffers from a number of drawbacks. The most significant drawback is the health risk created by the occupational radiation exposure experienced by survey personnel. Another drawback is the variable quality of surveys taken by this technique, which depends on such factors as the placement and orientation of the hand-held detector, the experience and attentiveness of the technician, the quality of the sketch used to document the survey, and the interpretation by the person reviewing the survey data. If the survey or its interpretation do not lead to an accurate understanding of the radiation hazards in the surveyed area, other workers may be exposed to unnecessarily high radiation doses in the future. Other work inefficiencies, leading to increased costs, can also result.

Mechanizing the radiation survey process would reduce the health risk to human workers. To also increase dependability, however, the mechanized survey system must be able to make accurate measurements of relevant variables and provide enough additional information about the surveyed area to facilitate an objective interpretation of survey data. Since efficiency is also a concern, the system should be easily transportable and should be able to adapt to different circumstances in any one location.

The problems to be overcome in meeting these goals can be subtle. For example, the contents of a room to be surveyed may change from day to day. Consequently, the system should not rely on pre-determined knowledge of the room's geometry or contents. In addition, an intervening object may prevent a radiation source from being visible from all points of view in a room. Consequently, a system that takes measurements from pre-determined points in a room, or that may be affected in an unknown way by a radiation source outside the system's field of view, may lack the necessary accuracy and dependability.

Since the purpose of surveys often is identification of radiation health hazards, the system should be able to provide certain types of information that permit the calculation of radiation dose equivalents, which relate to the health effects of radiation. To allow this, the system must be able to measure the energy of the incoming radiation. Additionally, the system should be able to resolve individual sources of radiation and measure the distances from such sources to the detector. To make these measurements more meaningful, the system should provide the human operator with a quick way to identify these sources.

Another problem to be overcome arises from the ability of certain types of high-energy radiation to penetrate, to a greater or lesser degree, the material surrounding a detector. In order to pinpoint a radiation source, the system should be able to detect the radiation coming in from a well-defined direction, while shielding the detector from radiation coming in from all other directions. In the case of gamma radiation, as well as other types of radiation that may be of interest, significant variations in the thickness of the shield will lead to significant variations in the attenuation of the radiation. Such variable attenuation creates difficulties in distinguishing the desired signal (namely, radiation measured along the desired direction) from background noise. Consequently, it is important to achieve substantially uniform attenuation of incident radiation in all directions other than the direction of observation. At the same time, it is necessary to prevent the shielding material from making the device so heavy or bulky that it is no longer easily mobile.

In light of the foregoing, there is a present need for a dependable and accurate radiation survey system.

SUMMARY OF THE INVENTION

The present invention provides a lightweight, compact system for high-resolution mapping of high-energy radiation sources, together with means for measuring the energy of incident radiation and for imaging and measuring the distance of radiation sources. Additionally, the present invention is adapted to the capability of being moved through remote areas containing radiation and transmitting video images with superimposed radiation maps to an operator who remains a safe distance away.

The radiation mapping system of the present invention includes a primary radiation detector that is directionally sensitive. The primary detector, together with its surrounding shield, is mounted within a rectangular housing. In a preferred embodiment, the detector is an inorganic scintillator material. The scintillator is optically bonded to a photomultiplier, which lies along the path of incident radiation and which attenuates such radiation only negligibly. This configuration reduces the volume of material necessary to shield the detector, by permitting the detector to be more centrally located within the shield. Substantially even attenuation of background radiation away from the direction of interest is achieved in the present invention by shaping the shield to be of substantially uniform thickness when measured from points along the central axis of symmetry of the scintillator. In a preferred embodiment, the shield is made from a machinable tungsten alloy weighing approximately half as much as the quantity of lead necessary to yield comparable gamma ray attenuation.

The primary detector is capable of operating in both narrow field and wide field collimation modes. Collimation is achieved by incorporating a cylindrical bore in an extension of the detector shield along the direction of observation. In the narrow field mode, a cylindrical metal snout with a hollow bore and made of shielding material is positioned over the front of the detector housing. To achieve the wide field collimation mode, the snout is rotated away by means of a motor in the detector housing so that it lies parallel with the long dimension of that housing. In the present embodiment, the solid angle fields of view in the wide field and narrow field are 8° and 4°, respectively.

A second radiation detector is mounted outside the housing of the primary detector, in order to obtain a substantially omnidirectional radiation reading. In the preferred embodiment of the invention, this secondary detector is an organic scintillator detector optically bonded to a photomultiplier, since the organic material has a composition and density very similar to human tissue. The output from this secondary detector is capable of corroborating measurements made by the primary detector, as well as alerting the operator to radiation sources outside the field of view of the primary detector.

The primary and secondary detector systems are mounted on the same movable platform. The platform is equipped with motors and a drive mechanism to provide accurate panning and tilting movements over a wide range of azimuths and elevations, permitting an entire room to be scanned except for a small area of floor under the platform and vehicle. Also mounted on the platform is a sensor control and communications interface. This contains control electronics for both counting the number of incident radiation pulses above a threshold energy and for converting detected pulses into digital signals containing information about the energy of such radiation. This dual system of pulse evaluation both reduces the problem of pulse pile-up in the event of high count rates, and provides greater accuracy by means of two sets of mutually corroborating measurements.

A rangefinder, video camera and laser pointer are mounted on the same platform as the systems described above, and are aligned to point in substantially the same direction as the primary detector. The rangefinder permits the accurate determination of the distance of radiation sources, thereby providing information necessary in calculating dose equivalents. The video camera gives the operator of the system a real-time video image of the area being surveyed. The laser pointer creates a bright spot on the video image to indicate the approximate center of the field of view of the primary detector.

The present invention is adapted to be mounted on a remotely operable vehicle. In the preferred embodiment, the vehicle and sensor platform will be less than 45 cm wide, so that the mobile system will be capable of negotiating typical facility geometries including labyrinths, berms and narrow passageways. In order to survey areas that are inaccessible by the robotic vehicle, the sensor platform can be detached from the vehicle as an integral unit and placed in such area.

Accordingly, it will be appreciated that the present invention provides a radiation mapping system that is compact, accurate and adaptable to a variety of radiation survey environments.

BRIEF DESCRIPTION OF THE DRAWINGS

The invention will be described in reference to the accompanying drawings, wherein.

DESCRIPTION OF THE PREFERRED EMBODIMENT

Figure 1:
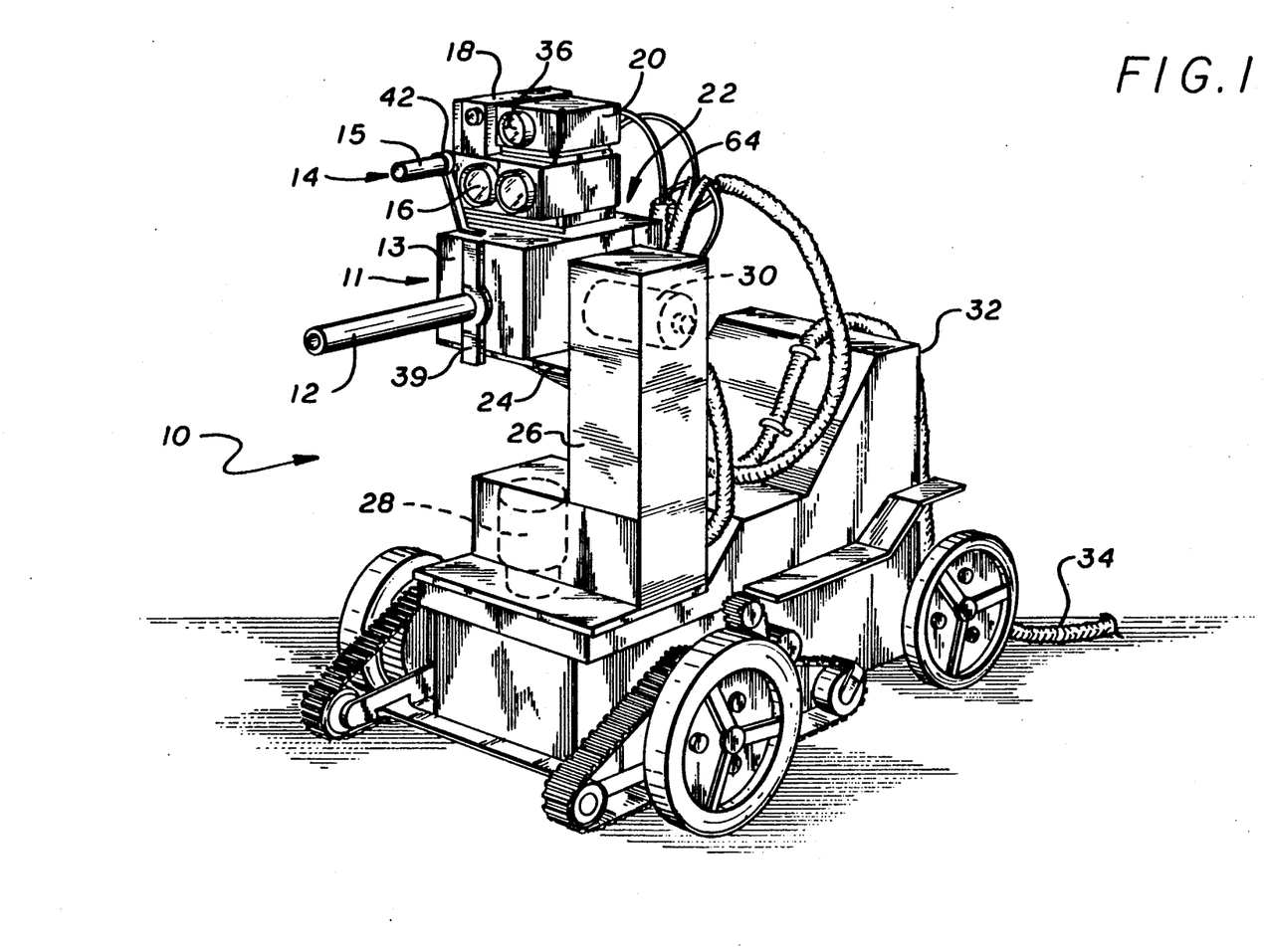
FIG. 1 is perspective view of a robotic vehicle on which a the present invention has been mounted.

FIG. 1 illustrates a preferred embodiment of the radiation mapping system 10 of the present invention mounted on a remotely controllable mobile robot vehicle 32. The radiation mapping system 10 employs primary radiation detector system 11, which is shown in FIG. 1 with the narrow-field collimator snout 12 rotated into place, together with the secondary detector 14, range finder 16, laser pointer 18, video camera 20, and sensor control and communications interface 22, all of which are mounted on a pan and tilt platform 24. The pan and tilt platform 24 is attached to an "L" shaped structure 26, designed for light weight and high strength. In the preferred embodiment, the "L" shaped structure 26 uses honeycomb aluminum encased in a thin stainless steel skin. The panning motor and drive mechanism 28 and tilting motor and drive mechanism 30 are also enclosed in the "L" shaped structure 26. In the present embodiment, the mechanisms 28 and 30 provide a movement of $-60°$ to $+90°$ in elevation and $\pm180°$ in azimuth with better than $0.5°$ accuracy. This wide range of movement permits an entire room to be scanned except for a small area of the floor under the sensor platform and the vehicle 32 on which the present invention may be mounted. The mechanisms 28 and 30 may be adapted to provide a number of different scanning protocols for use in conducting radiation surveys by means of the primary detector system 11. In a preferred embodiment, such protocol will consist of a raster scan of incremental changes in azimuth at constant altitude, followed by an incremental change in altitute and a return scan of incremental changes in azimuth, followed by another incremental change in altitude the same direction as the previous one, and repetitions of the previous steps.

In the preferred embodiment, the vehicle 32 and the radiation mapping system 10 will be less than a total of 45 cm wide, so that the system will be capable of negotiating typical facility geometries. However, in order to survey areas that are inaccessible by such a vehicle, it may be preferable to detach the radiation mapping system 10 from the vehicle 32 and to place it in the room to be surveyed. Vehicle 32 may preferably be a battery powered robotic vehicle that can be remotely operated into the area to be surveyed.

Each of the instruments mounted on pan and tilt platform 24, together with controls for the motors and drive mechanisms 28 and 30 and the vehicle 32, are electronically connected to the sensor control and communications interface 22. The sensor control and communications interface 22 is connected to the remote operator station by means of a cable 34. Cable 34 may be a fiber optic cable, and of a sufficient length to permit remote operation of the radiation mapping system 10 and the vehicle 32.

The rangefinder 16 and the video camera 20 should be aligned so that the centers of their respective fields of view substantially coincide with that of the primary radiation detector 11. In the preferred embodiment, the range finder 16 uses an eye-safe laser to provide resolution of better than 1 cm over a distance of 0.2 m to greater than 100 m. The video camera 20 in the preferred embodiment will employ a charge-coupled device, will permit color video photography, and will have a motorized zoom and focus lens 36, permitting the operator to closely examine objects in the room.

The laser pointer 18 should employ a visible light laser and be aligned so that the laser spot will coincide with the center of the field of view of the primary radiation detector 11 and will be visible in the field of view of the video camera 20. In this way, the pointer will help the operator precisely locate where the primary radiation detector 11 is pointing. Commercially available components may be used for the video camera 20 and laser pointer 18.

Figure 2:
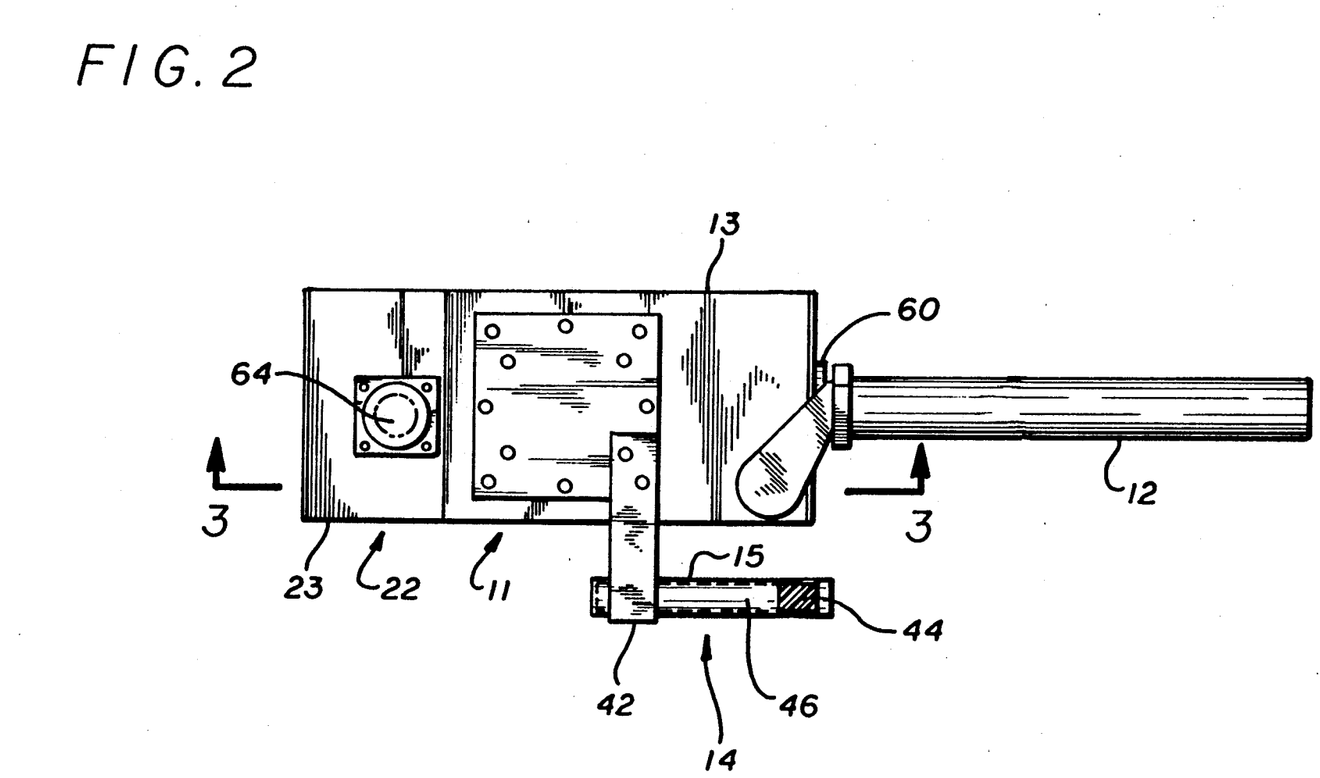
FIG. 2 is a top plan diagrammatic view of the primary and secondary detector systems of the present inventions.
Figure 3:
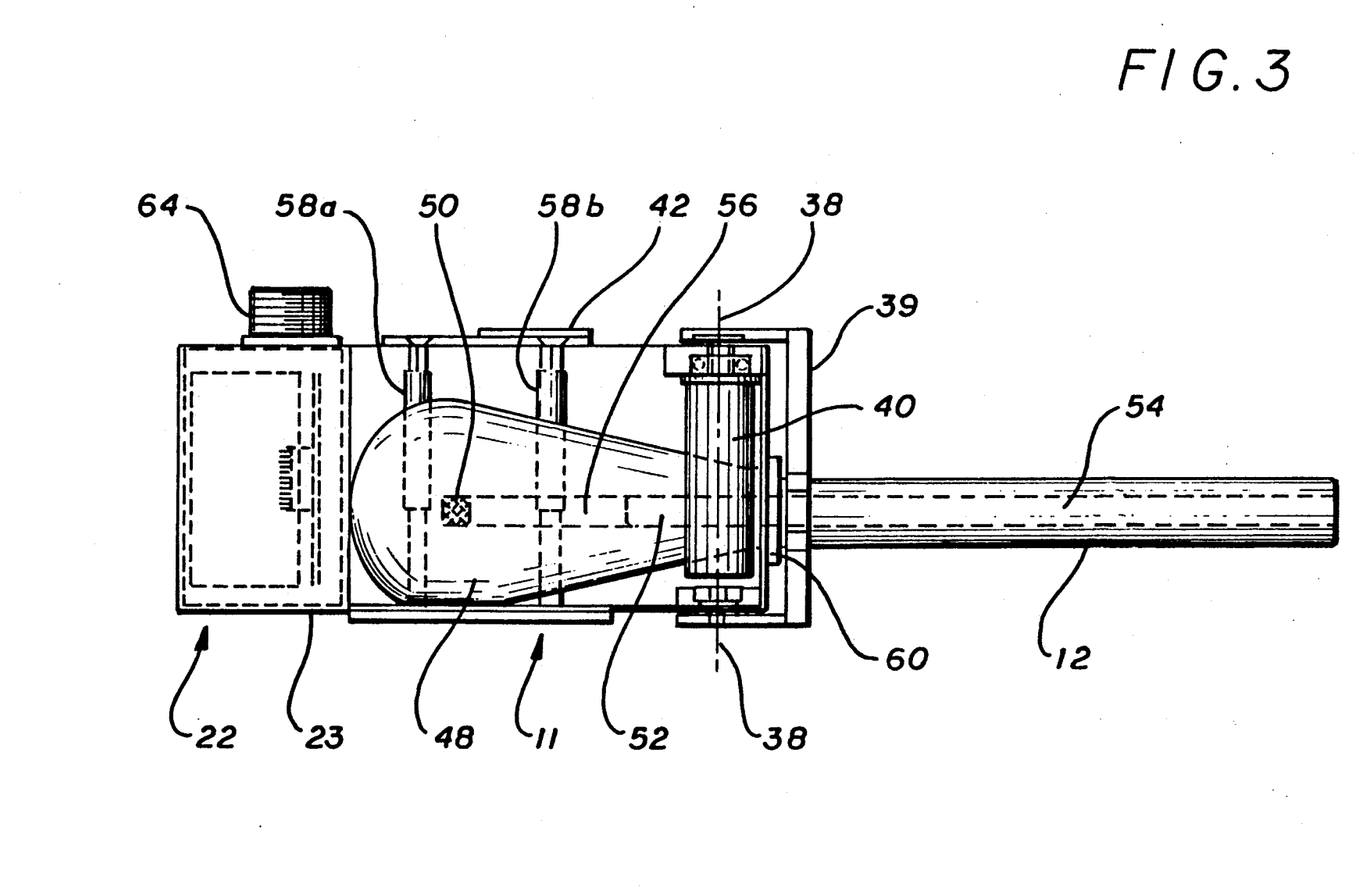
FIG. 3 is a sectional view along lines 3—3 of FIG. 2 showing the detector systems of the present invention.

Referring to FIGS. 2 and 3, the narrow field collimator snout 12 is connected to bracket arm and yoke assembly 39. The bracket arm assembly 39 may rotate around axis 38, powered by a motor 40 within the primary detector system housing 13, permitting the snout 12 to be moved into or out of alignment with the primary detector system 11. FIGS. 2 and 3 illustrate the position of the snout 12 when the primary detector system 11 is operating in the narrow-field collimation mode. The primary detector system 11 can also operate in a wide-field mode, which is accomplished by rotating the snout 12 clockwise in the view shown in FIG. 2 so that the long axis of the snout 12 is parallel to and beside the longer side of the primary detector housing 13. In the present embodiment, the primary detector system 11 has a 4° solid angle field of view When the snout 12 is in the position shown in FIG. 2, and an 8° solid angle field of view when the snout 12 has been rotated away.

In the present embodiment, the primary detector system housing 13 is made of stainless steel.

The secondary detector system 14 is mounted to the housing 13 of the primary detector system 11 by means of bracket arm 42. Since it is desirable for the secondary detector system 14 to obtain a substantially omnidirectional radiation reading, the bracket arm 42 is angled in such a way as to hold the secondary detector system 14 away from primary detector system 11 and snout 12, in order to reduce the radiation shielding effect that might be produced by shielding material.

In the preferred embodiment, the secondary radiation detector system 14 consists of a commercially available plastic scintillator 44 that is optically bonded to a commercially available photomultiplier tube 46. The system 14 is enclosed in a cylindrical metal housing 15. To further reduce the shielding effects of the collimator snout 12, the scintillator 44 should not be located directly above the snout 12 when the snout 12 is rotated back for the wide field collimation operation of the primary detector 11.

FIG. 3 shows a sectional view of the primary detector system 11, collimator snout 12 and sensor control and communications unit interface 22. The main features of the primary detector system 11 are the radiation shield 48, the radiation detector 50, and the cylindrical collimation bore 52. The aperture created by the bore 52 at the front end of the primary detector system 11 is covered by metal foil that does not shield detector 50 from radiation of interest. The collimation bore 54 in the collimation snout 12 is of the same diameter and lies along the same axis as the bore 52.

In the preferred embodiment of the invention, the primary detector 50 is a cylindrical bismuth germanate crystal coupled to a commercially available photomultiplier tube 56, such as Hammatsu tube type 647-04, precoated with a magnetic shield and selected for low noise. The photomultiplier tube 56 lies within the collimation bore 52 along the path of incident radiation. The scintillator crystal 50 is surrounded by reflectors, to increase the signal transmitted to the photomultiplier tube 56. In the present embodiment, the output wires of the photomultiplier tube 56 exit through eight small holes located near the front of the shield, and are drawn back within the primary detector system housing 13 to exit through holes at the back of the housing 13 into the sensor control and communications interface housing 23.

The shield 48 is held in place in the primary detector housing 13 by means of four rods, of which two, 58a and 58b, are shown in FIG. 3. In addition, the shield 48 is fixed to the front of the primary detector housing 13 by means of a threaded ring 60.

Figure 4:
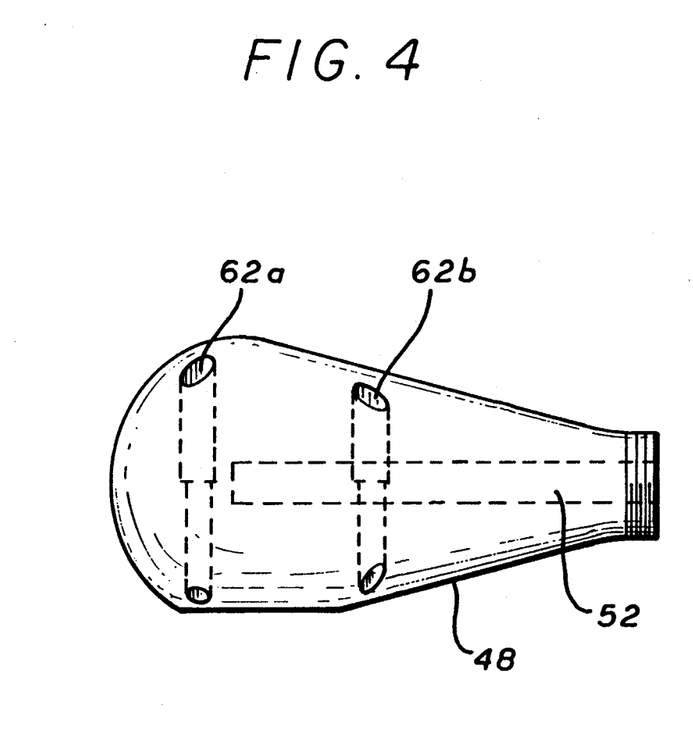
FIG. 4 is a side elevation view of the primary detector shield of the present invention.
Figure 5:
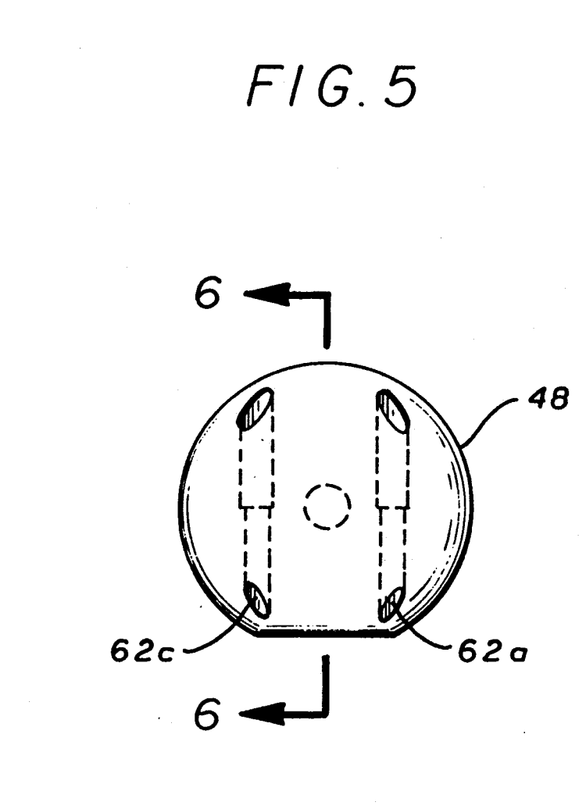
FIG. 5 is a rear elevation view of the primary detector shield of the present invention.

FIGS. 4 and 5 illustrate the positioning of three of the four tap holes 62a through 62c for the shield positioning rods. The fourth tap hole lies opposite tap hole 62b on the same side of the collimator bore 52 as tap hole 62c.

Figure 6:
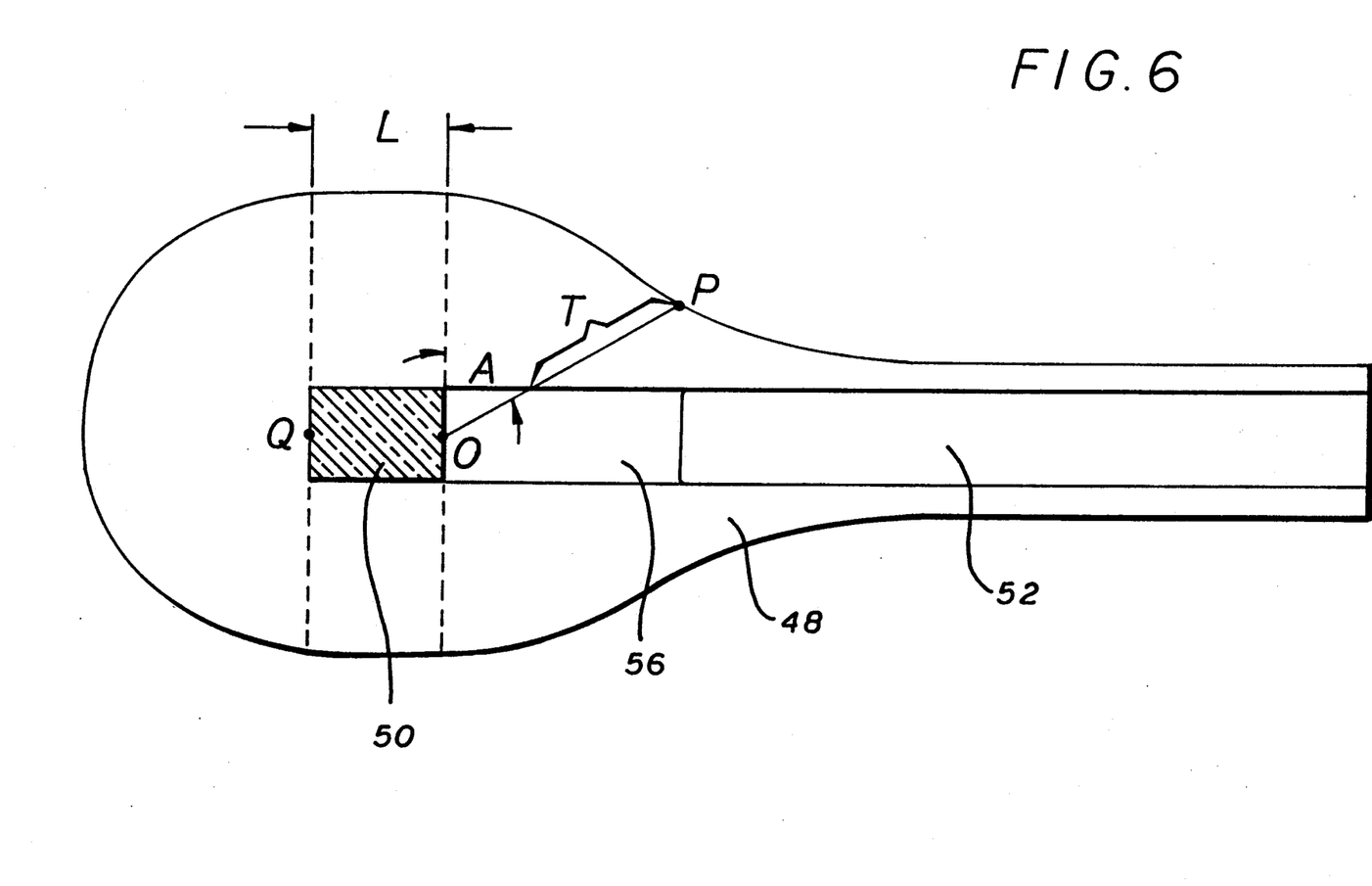
FIG. 6 shows a sectional view of the primary detector and shield of the present invention taken along lines 6—6 of FIG. 5.

FIG. 6 illustrates certain principles in the design of shield 48 in an embodiment adapted for shielding of gamma radiation. The cross-sectional shape of the shield 48 is determined in such a way that the portion T that intersects the shielding material of vector OP extending from the center O of the front face of the detector 50 to a point P on the surface of the shield 48 remains substantially constant for all values of the angle A. In the present embodiment, the invention incorporates certain slight departures from a constant value of T. For example, the surface of the shield 48 is parallel to the surface of the cylindrically-shaped detector 50 in the region marked by L. The area to the left of the detector in FIG. 6 is approximately hemispherical, centered on the center point O of the rear face of the detector 50. In addition, to improve the gravitational stability of the primary detector system 11, the bottom of the shield 48 has been flattened slightly so that it rests more evenly on the floor of the primary detector housing 13. Apart from these variations and the positioning of the tap holes 62, the shield 48 is substantially cylindrically symmetrical around the axis of the bore 52. In the preferred embodiment, the shield 48 is made from a machinable tungsten alloy type HD-17. The external collimation snout 12 is made of the same material.

Figure 7:
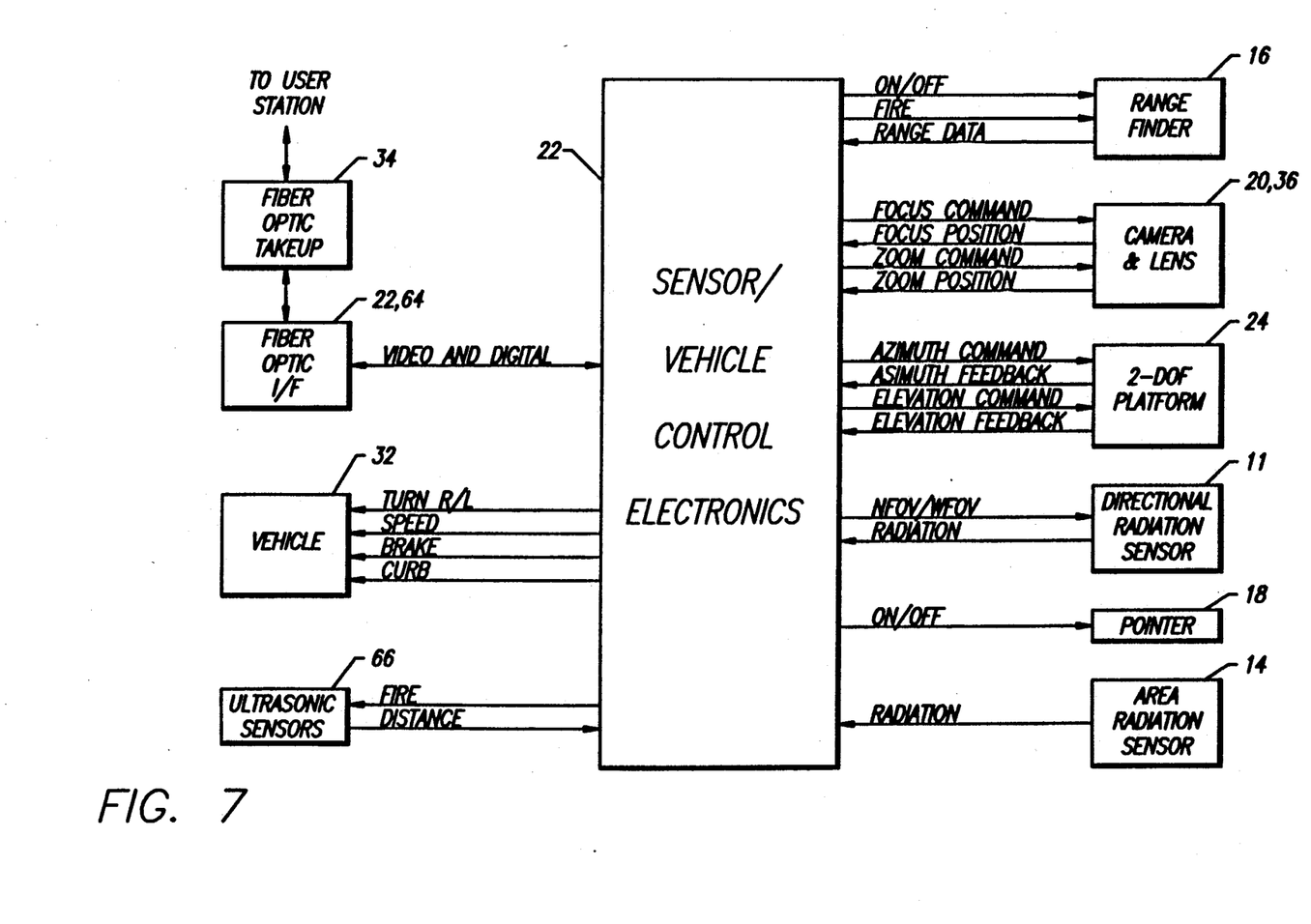
FIG. 7 is a block diagram of the sensor control and communications interface of the present invention.

FIG. 7 is a functional block diagram of the sensor control and communications interface 22. The interface 22 is connected to the two degree of freedom (2-DOF) pan and tilt platform 24 and related motor and drive systems 28 and 30, secondary detector 14, range finder 16, laser pointer 18, video camera 20 and vehicle 32 through the connector assembly 64 shown in FIGS. 2 and 3. Electronics within the sensor control and communications interface 22 convert detected pulses from each of the photomultipliers 46 and 56 into two digital signals. One signal is a transistor-transistor logic (TTL) level pulse train comprised of pulses one microsecond wide. Each pulse corresponds to a detected pulse of incident radiation above a preset energy threshold. The other signal is a TTL-level signal whose frequency is proportional to the energy deposited in the respective scintillator 44 or 50.

The sensor control and communications interface 22 communicates with the remote operator workstation by means of a cable 34 that also is connected to the connector system 64. In the preferred embodiment, the cable 34 is a fiber optic cable of a suitable length, e.g. not less than 60 m in length. In the preferred embodiment, the sensor control and communications interface 22 is also connected to ultrasonic sensors 66 which measure the distance of vehicle 32 from nearby obstacles.

The sensor control and communications interface 22 may also be adapted so that any or all of its functions relating to the primary radiation detector system 11 are performed by a separate control and communications unit, or so that any or all of the functions of said sensor control and communications interface 22 are performed at the operator workstation.

Figure 8:
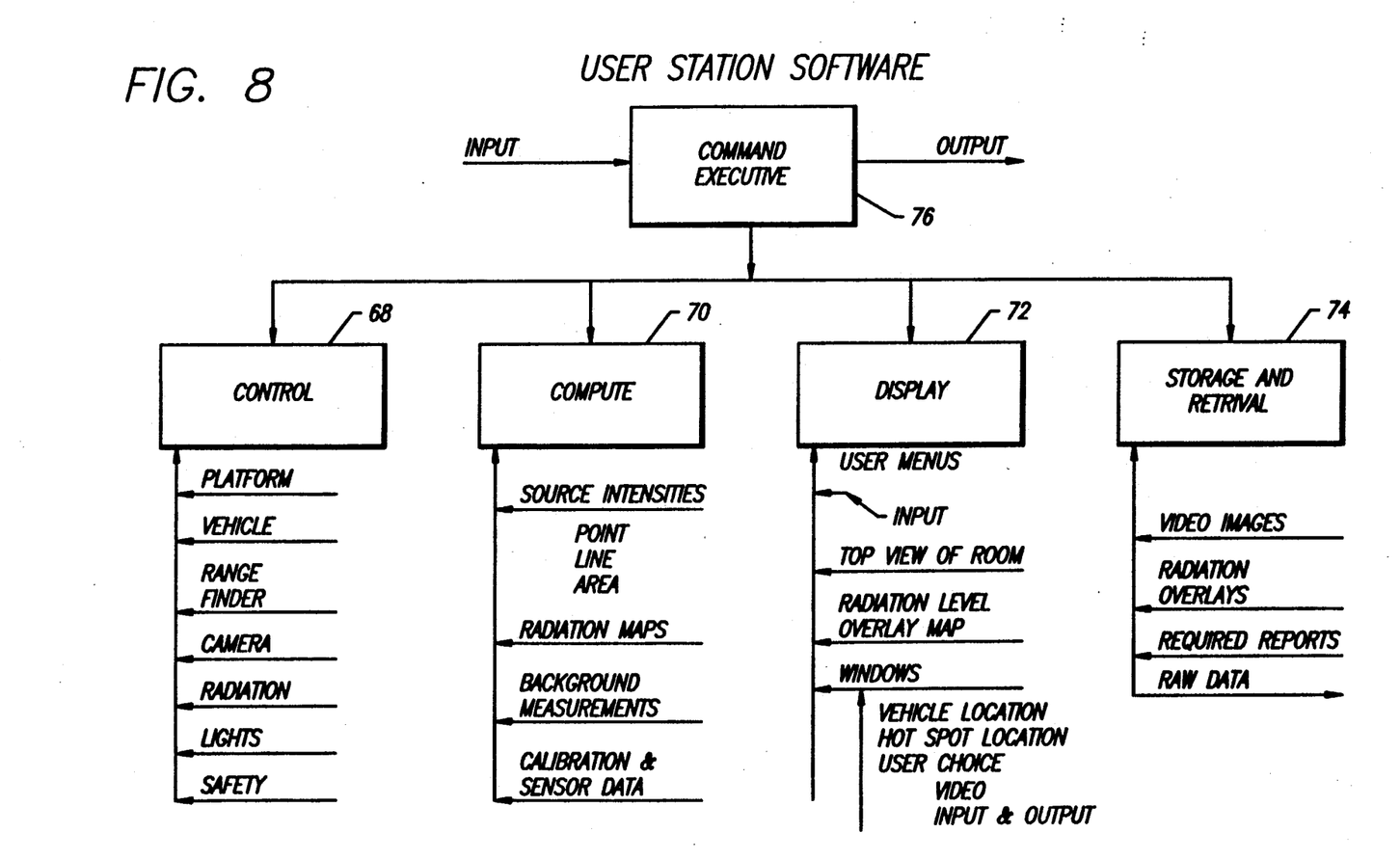
FIG. 8 is a block diagram of the functions of user station software in the preferred embodiment of the present invention.

FIG. 8 is a block diagram illustrating basic functions of the operator workstation in the preferred embodiment of the invention, including control functions 68, computing functions 70, display functions 72, storage and retrieval functions 74 and command and executive functions 76. Such functions may be implemented in software, firmware or hardware. In the preferred embodiment, the operator workstation consists of an industrial personal computer adapted for communicating with the sensor control and communications unit 22. In such preferred embodiment, the workstation will display live video from the video camera 20 on a workstation video monitor, and will integrate data from the radiation detector systems 11 and 14, range finder 16 and camera 20 to provide the operator with a clear visual representation of the radiation environment in the surveyed area. In a preferred embodiment the operator station software will be based on Microsoft Windows 3.0, a DOS shell and will contain, among other things, a means of coding radiation intensities as colors, overlaying the source intensity image mapped by the detector system 10 over the video image provided by camera 20, and dose map computation algorithms incorporating corrections for room return, scattering off objects, and source geometry. In the preferred embodiment the workstation system will also have the capability of capturing video images on disk so that they may be archived.

The foregoing description is of the best currently contemplated mode of carrying out the invention. This description is made for the purpose of illustrating the general principles of the invention, and is not to be taken in a limiting sense. In particular, although the invention is described with reference to the detection of gamma radiation and the imaging of radiation sources in the context of a facility in Which radioactive materials are stored or used, the invention may be utilized in other applications where high-energy radiation sources are to be measured and imaged. The scope of the invention is best determined by reference to the appended claims.

What is claimed is:

1. A radiation detection and mapping system, comprising:
   means for detecting radiation from sources of radiation within a restricted solid angle;
   means for shielding said means for detecting radiation so that incident radiation is substantially uniformly attenuated over all directions other than the restricted solid angle, said means for shielding having a substantially uniform thickness when measured from points along a central axis of symmetry of said means for detecting radiation;
   means for determining the distance between the means for detecting radiation and the sources of radiation;
   means for visually imaging the sources of radiation and their environment; and
   means for moving the detecting means, distance determining means and imaging means through a range of altitudinal and azimuthal angles.

2. The system of claim 1, further comprising a means for remotely moving said system over a range of locations.

3. The system of claim 1, further comprising a means for detecting ambient radiation over a substantially unrestricted solid angle.

4. The system of claim 1, wherein said means for detecting radiation includes means for varying the size of said restricted solid angle.

5. The system of claim 1, further comprising means for indicating the approximate center of the restricted solid angle of the detection means.

6. A radiation detection system comprising:
   means for detecting radiation from a restricted solid angle; and
   means for shielding said detecting means so that incident radiation is substantially uniformly attenuated over all directions other than the restricted solid angle, said means for shielding having a substantially uniform thickness when measured from points along a central axis of symmetry of said means for detecting radiation.

7. The system of claim 6, wherein the detecting means comprises a scintillator counter and a photomultiplier, said photomultiplier optically bonded to said scintillator counter.

8. The system of claim 6, wherein the means for shielding provides substantially uniform attenuation of gamma radiation over all angles other than the restricted solid angle.

9. The system of claim 6, wherein said means for detecting radiation includes means for varying the size of said restricted solid angle.

* * * * *

UNITED STATES PATENT AND TRADEMARK OFFICE
CERTIFICATE OF CORRECTION

PATENT NO. : 5,286,973

DATED : February 15, 1994

INVENTOR(S) : George B. Westrom, Robert E. Carlton, Lloyd R. Tripp

It is certified that error appears in the above-identified patent and that said Letters Patent is hereby corrected as shown below:

On the Title Page, Item [75] add additional inventors as follows:
Frank A. Marian, Livingston, N.J.;
William J. Millsap, Kennewick, Wa.;
Harry T. Roman, East Orange, N.J.;
Gerald E. Gore, North Branch, N.J.;
Joseph M. Simplicio, New York, N.Y.;
Gary C. Re, Croton, N.Y.; and
Jacob Celnik, Rockland, N.Y.

Signed and Sealed this

Twenty-first Day of June, 1994

Attest:

BRUCE LEHMAN

Attesting Officer *Commissioner of Patents and Trademarks*